Patented Sept. 8, 1953

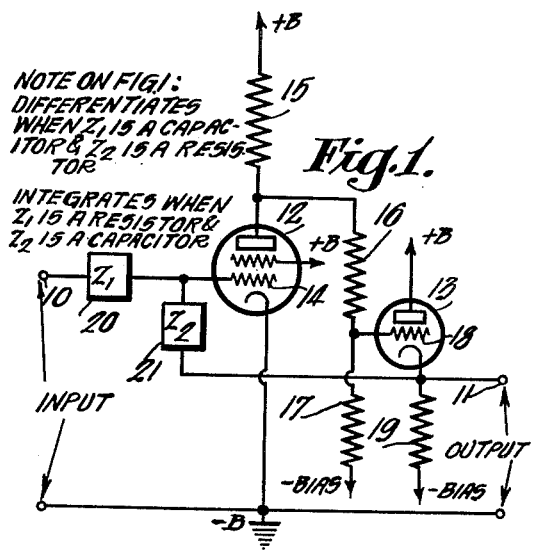
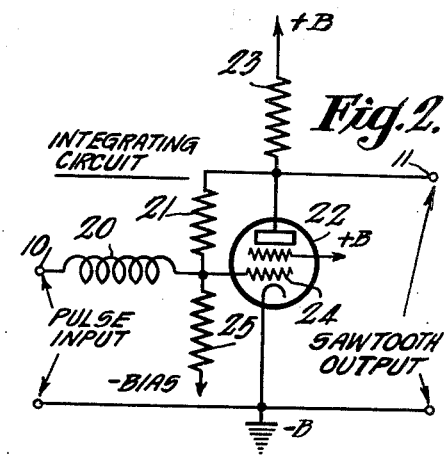
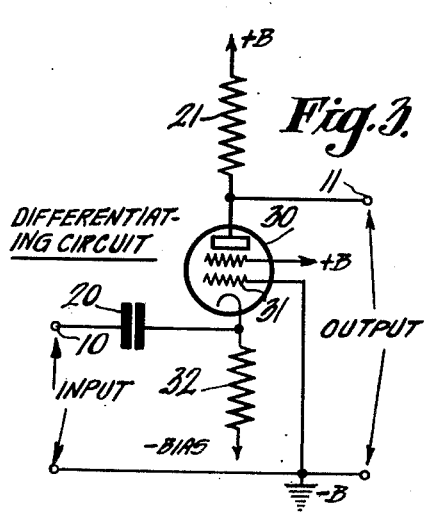
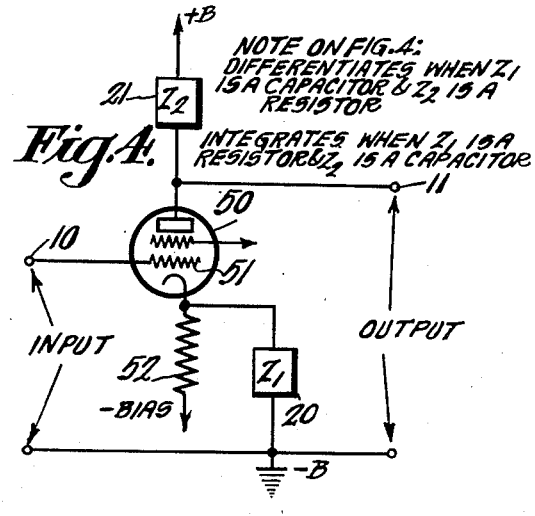

2,651,719

UNITED STATES PATENT OFFICE 2,651,719

CIRCUITS FOR MODIFYING POTENTIALS

Eric Lawrence Casling White, Iver, England, assignor to Electric and Musical Industries, Limited, a British corporation Application November 28, 1945, Serial No. 631,436
In Great Britain January 12, 1944

Section 1, Public Law 690, August 8, 1946
Patent expires January 12, 1964

1 Claim.  (Cl. 250—27)

This invention relates to electric circuits for modifying electric potentials. More particularly the invention relates to circuits for deriving from a first and given potential a second potential which is mathematically related to the first potential in integral or derivative manner with respect to time. In one aspect the invention relates to the generation of electrical variations of sawtooth character.

Circuits for so modifying a given potential that the modified potential stands to the given potential in the relation of the mathematical integral or derivative with respect to time of the given potential are well known. For example, if a given potential is applied to a circuit consisting simply of a resistance and a capacity in series it is possible to derive from the circuit a modified potential which is related with accuracy to the mathematical integral or derivative of the given potential, providing that the modified potential is always small compared with the given potential, or that the frequencies of effective Fourier components of the given potential lie within a certain frequency range determined by the constants of the circuit. It is often desirable to obtain a greater amplitude of modified potential or a wider range of operating frequencies. The object of the present invention is to provide improved circuits whereby these ends may be achieved.

According to the present invention, there is provided an electric circuit arrangement for modifying a given potential comprising a source of said potential, a first impedance connected effectively at one end to said source so that in operation said given potential is effectively applied to said end, a degenerative electron discharge valve amplifier arranged to provide within the effective operating frequency range of said source an impedance at a point in its circuit small compared with said first impedance, said first impedance being connected at its other end to said point whereby the current in said impedance due to said potential is determined substantially only by said given potential and said impedance, there being included in the circuit of said amplifier a second impedance which in said effective operating frequency range is large compared with the impedance provided by said amplifier at said point and of different electrical nature from said first impedance, the arrangement being such that the whole or a fixed proportion of said current flows in said second impedance and a potential modified compared with said given potential is developed dependent substantially only on said current and said second impedance.

In order that the said invention may be clearly understood and readily carried into effect, it will now be more fully described with reference to the accompanying drawings in which:

Figures 1 to 4 illustrate some embodiments of the invention diagrammatically. In these drawings like reference numerals indicate like elements.

Fig. 1 shows a circuit arrangement for modifying potentials in a predetermined manner. The source, not shown, of these potentials is connected to terminal 10 so as to develop said potentials thereat. Potentials modified in the required manner are developed at terminal 11. Thermionic valves 12 and 13 together with their circuit connections including the coupling elements 16, 16, 17 and 19 constitute said thermionic amplifier aforementioned and the circuit elements 20 and 21 said first and second impedances, respectively. In said thermionic amplifier the valve 12 is arranged to develop a large gain between its anode and its control grid 14. Potentials are developed at the anode of valve 12 by means of the anode circuit impedance 15 which may be a resistance and are transferred by means of the coupling circuit 16, 17 to the control grid 18 of valve 13. Impedance elements 16 and 17 may be resistances and the end of resistance 17 not connected to control grid 18 will then be connected to a point of fixed and sufficiently negative potential to bring said control grid to a proper operating potential. The anode of valve 13 is connected directly to a point of fixed positive potential while the cathode of said valve is connected by means of the large resistance 19 to a point of fixed negative potential so that potential variations occurring at said cathode are substantially identical with those applied to the control grid 18. If it is desired that the operating range of frequencies of said amplifier should include those at which stray capacities affect the gain of the amplifier, known methods may be employed for extending the amplifier response.

It will be seen that the impedance 21 constitutes a feedback connection for the amplifier and it is arranged that the amplifier is thereby rendered highly degenerative. Impedance 21 may be of any arbitrary electrical nature, different from that of impedance 20 which is connected between the terminal 10 and control grid 14. These two impedances are so chosen that together they determine the required form of the potential developed at terminal 11 in relation to the potential applied at terminal 10. They suffice to determine the desired relationship by virtue of the high degree of degeneration present in the circuit. Since the feedback connection to the input of the amplifier, namely to the control grid 14, is of shunt character, the input impedance of the amplifier, that is, the impedance presented to impedance element 20, is reduced by the feedback at least in a certain range of frequencies to a low value. For all frequencies therefore for which the impedance of element 20 is large compared with said input impedance the current flowing in element 20 will depend only on the impedance of this impedance element and on the potential applied at the terminal 10. If $Z_1(j\omega)$ represents this impedance and U the applied potential, said current will be represented by $U/Z_1(j\omega)$. This current must necessarily flow in the impedance element 21 and, if this impedance is sufficiently large, will set up potential variations thereby large compared with those occurring at the grid 14 of the valve 12 which by reason of said low value of impedance thereat are of small magnitude. If the output potential thus set up at the cathode of valve 13 be represented by V and the impedance of impedance element 21 be represented by $Z_2(j\omega)$, V will be related to the potential U according to $$V = -\frac{Z_2(j\omega)}{Z_1(j\omega)} U \quad (1)$$

This relation applies to all harmonic vibrations of frequency $\omega$ such that the conditions specified with regard to the magnitudes of $Z_1(j\omega)$ and $Z_2(j\omega)$ are satisfied. If U is not a harmonic vibration but may be regarded as composed of harmonic vibrations whose various frequencies are such that said conditions apply, then it is possible to write the relation between the output potential V and input potential U as $$V = -\frac{Z_2(D)}{Z_1(D)} U \quad (2)$$

where D represents the differential operator $$\frac{d}{dt}$$

The operator $Z_2(D)/Z_1(D)$ represents the desired predetermined relation between the potential applied to the circuit at terminal 10 and that derived at terminal 11.

Means for applying the proper biasing potential to the control grid of valve 12 have not been described but any known and suitable means may be employed. If impedance 21 is a simple resistance and impedance 20 a simple capacity, it is sufficient to bring the cathode of valve 13 to the necessary biasing potential. With this arrangement and if R is said resistance and C said capacity Equation 2 becomes $$V = -RCDU$$

that is to say $$V = -RC\frac{dU}{dt}$$

Thus with this arrangement V is the time derivative of U and the circuit is a differentiating circuit. If the impedance 21 is a capacity and impedance 20 is a resistance, then the relation between V and U is of the form $$V = -\frac{1}{RCD} U$$

that is $$V = -\frac{1}{RC} \int U dt$$

and the circuit is an integrating circuit. Other forms of impedance elements may be used in the circuit for impedances 20 and 21. As has been stated, however, they must always be of electrically different nature, that is to say the impedance functions $Z_1(j\omega)$ and $Z_2(j\omega)$ must be different. With such other forms the circuit can be made to modify or shape an applied potential in other ways than those just described by way of illustration.

Figure 2 shows another embodiment of the invention. In this figure, the amplifier comprises simply the amplifier valve 22 with anode load resistance 23 whereby potentials may be developed at the anode of the valve and supplied to the output terminal 11. The impedance 21 is a simple resistance and serves as in the previous figure to render the amplifier highly degenerative by connecting the anode of valve 22 with its control grid 24 besides contributing to the shaping of the potential applied to the circuit at the input terminal 10. The cathode of the valve 22 is grounded and the proper biasing potential is applied to the grid 24 by means of the high resistance 25 connected to a point of appropriate fixed negative potential. The impedance 20 is connected between the input terminal 10 and the control grid 24 and is constituted by an inductance. The functioning of the circuit is according to the same general principles as those described with reference to Figure 1. If the resistance 21 is of magnitude R and the inductance 20 of magnitude L then the potential V developed at terminal 11 in response to potential U applied to terminal 10 is given by $$V = -\frac{R}{LD} U = -\frac{R}{L} \int U dt$$

provided such effective frequency components as may be present in the potential U lie above a certain limiting frequency for which the impedance of the inductance L is large compared with the impedance presented to the inductance by the amplifier input circuit. The resistance R is also large compared with the input impedance. The circuit may in one application be used to integrate rectangular pulses applied to the input terminal 10 and provide sawtooth variations of potential at the output terminal 11 of amplitude large compared with the largest amplitude of linear sawtooth variation capable of being generated by means of impedances 20 and 21 in the absence of said amplifier. If the impedance 20 is a resistance and impedance 21 is an inductance the circuit will function to provide potentials which are time derivatives of applied potentials if these potentials have effective frequency components such that for these components the impedances 20 and 21 are large compared with the input impedance of the amplifier developed at control grid 24. With this arrangement it will be necessary to isolate the anode potential from the control grid of valve 22 by a suitable blocking condenser.

Figure 3 shows an arrangement according to the invention in which a different form of amplifier is employed. This particular arrangement is claimed in Patent No. 2,562,792, issued July 31, 1951, in the name of I. J. P. James. The amplifier comprises the amplifier valve 30 having its control grid 31 connected to ground and cathode connected to a point of fixed negative potential by means of resistance 32. The input terminal 10 is connected to the cathode of valve 30 through impedance 20 which may be a capacity as indicated while the output terminal is connected to the anode of valve 30 at which potentials are developed in response to potentials applied to terminal 10 by virtue of impedance 21 which may be a resistance connected in the anode circuit of valve 30. The impedance 32 is made sufficiently large for the circuit to be highly degenerative and to present at the cathode of valve 30 and to impedance 20 an impedance of small magnitude substantially equal to or comparable with the reciprocal of the mutual conductance of valve 30. Provided impedance 20 is large compared with the impedance presented to it at said cathode, the current in impedance 20 is determined solely by the magnitude of said impedance and the potential applied to terminal 10. This current effectively divides between the two branches formed by the impedance 32 and the valve 30. The latter branch effectively presents a very low impedance compared with that of the former and substantially the whole of the current flowing in impedance 20 is diverted into said latter branch. Of this a proportion will flow in the screen grid circuit of valve 30 but a major portion will flow in the anode circuit of the valve and thus in impedance 21. The valve 30 may be operated so that these proportions remain fixed and this being the case the relation between input and output potentials may be written $$V = K \frac{Z_2(D)}{Z_1(D)} U \qquad (3)$$

where K is the proportion of current flowing in the anode circuit, this relation holding subject to the condition that there are no frequencies effectively present in the potential U for which the impedance of impedance element 20 is not large compared with the impedance presented to it at the cathode of valve 30. As before, $Z_1(j\omega)$ and $Z_2(j\omega)$ represent the impedances of impedance elements 20 and 21 respective at frequency $\omega$. If the valve 30 is replaced by a triode the proportion K becomes unity. The effect of a screen within the valve is still obtained in this case, since as the control grid 31 is earthed it acts as a screen between the input and output circuits of valve 30. If desired the impedance 21 may be inserted in the screen lead of valve 30 instead of the anode lead in which case the output terminal 10 will be connected to the screen electrode of valve 30. If necessary grid 31 may be used for mixing additional potentials to the output potentials. The circuit as shown is a differentiating circuit.

Figure 4 shows a further embodiment of the invention. The amplifier comprises the amplifier valve 50 to the control grid of which is connected directly the terminal 10 to which are applied the given potentials to be modified. The cathode of the amplifier valve 50 is connected to the resistance 52 and thereby to a point of fixed negative potential and is further connected to one end of impedance 20, the other end of which is connected to ground. The amplifier is rendered highly degenerative by arranging that the total cathode circuit impedance in the operating range of frequencies is large compared with the reciprocal of the mutual conductance of the valve 50; thus the impedance 20 may be made large compared with the reciprocal of the said mutual conductance and preferably the resistance 52 made large compared with the impedance 20. The anode of valve 50 is connected to a point of fixed positive potential by means of the impedance 21 and is also connected to the terminal 11 at which output potentials are developed modified compared with the given potentials applied to the terminal 10. It will be seen in view of the large value of cathode circuit impedance that variations of potential at the terminal 10 will be repeated substantially identically at the cathode of valve 50. Said variations of potential are therefore applied substantially unchanged across the impedance 20 and the current flowing in this impedance in response to given potentials applied to terminal 10 is thus dependent only on said given potentials and on the value of the impedance 20. At the cathode of valve 50 this current will divide into two branches, one through the resistance 52 and the other through the valve 50. Since the resistance 52 is of large impedance compared with the impedance of the valve 50 presented at its cathode, the current in impedance 20 flows substantially entirely through valve 50 and it may be arranged that a fixed proportion of this current appears in the anode circuit of valve 50, namely, in the impedance 21. The potential developed at the anode of valve 50 is thus dependent substantially only on the said current and on the magnitude of the impedance 21 in the anode circuit of said valve. Thus it will be seen that the relation between the applied potential, U, to the terminal 10 and the modified potential, V, developed at the output terminal 11, is that given by Equation 3 above (except for a change of sign). It is to be noted that one end of impedance 20 is connected to a point of low impedance, namely, the cathode of valve 50 which low impedance arises from the high degree of degeneration applied to the amplifier valve 50, while effectively the given potentials applied to terminal 10 are applied to the grounded end of said impedance 20. If impedance 20 is suitably conductive in D. C. manner the resistance 52 may be omitted. It has been assumed that impedance 21 is conductive in such manner. If this is not the case, however, then this impedance will require to be shunted by, for example, a resistance of suitably large value.

It is to be noted that in all of the above described embodiments of the invention the source of the given potentials is assumed to be connected between the terminal 10 and a point of fixed potential which point is conveniently ground as indicated in the drawings.

I claim as my invention:

A wave shaping circuit for changing the wave shape of an applied voltage, said circuit comprising an amplifier tube having a control electrode, a cathode and an anode, an anode impedance unit through which a positive operating potential is applied to said anode, a cathode follower tube having a control electrode, a cathode and an anode, an output impedance unit in the cathode circuit of said cathode follower tube, means for coupling the anode of said amplifier tube to the control electrode of said cathode follower tube so that the applied voltage at the control electrode of the amplifier tube and the output voltage at the cathode of the cathode follower tube are out of phase, a first impedance unit of one electrical nature having one end connected to the control electrode of said amplifier tube, said applied voltage being applied to the other end of said first impedance unit, a second impedance unit of a different electrical nature connected between the cathode of said cathode follower tube and the control electrode of said amplifier tube whereby there is degenerative feedback, and means for taking the reshaped wave off the output impedance unit of said cathode follower tube, wherein said first impedance unit has an impedance that is large compared with the impedance at the control electrode of said amplifier tube, and wherein the first impedance unit is a resistor and the second impedance unit is a capacitor whereby the wave shaping circuit acts as an integrating circuit.

ERIC LAWRENCE CASLING WHITE.

References Cited in the file of this patent

UNITED STATES PATENTS

| Number | Name | Date |
|---|---|---|
| 2,232,076 | Newsam | Feb. 18, 1941 |
| 2,251,973 | Beale et al. | Aug. 12, 1941 |
| 2,412,435 | Whiteley | Dec. 10, 1946 |
| 2,436,891 | Higinbotham | Mar. 2, 1948 |

FOREIGN PATENTS

| Number | Country | Date |
|---|---|---|
| 515,158 | Great Britain | Nov. 28, 1939 |